(12) United States Patent
Wang et al.

(10) Patent No.: US 11,908,124 B2
(45) Date of Patent: Feb. 20, 2024

(54) PAVEMENT NONDESTRUCTIVE DETECTION AND IDENTIFICATION METHOD BASED ON SMALL SAMPLES

(71) Applicant: Chongqing University, Chongqing (CN)

(72) Inventors: Hui Wang, Chongqing (CN); Zijie Lin, Chongqing (CN); Wenruo Fan, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 18/346,458

(22) Filed: Jul. 3, 2023

(65) Prior Publication Data

US 2024/0013368 A1 Jan. 11, 2024

(30) Foreign Application Priority Data

Jul. 5, 2022 (CN) .......................... 202210784688.1

(51) Int. Cl.
*G06T 7/00* (2017.01)
*G06T 7/11* (2017.01)
(Continued)

(52) U.S. Cl.
CPC .......... *G06T 7/0004* (2013.01); *G06T 3/4092* (2013.01); *G06T 7/11* (2017.01);
(Continued)

(58) Field of Classification Search
CPC ....... G06T 7/0004; G06T 3/4092; G06T 7/11; G06T 2207/20021; G06T 2207/30132; G06V 10/40
See application file for complete search history.

(56) References Cited

U.S. PATENT DOCUMENTS 11,582,485 B1 * 2/2023 Cherian ............... G06V 30/194
2021/0372938 A1 * 12/2021 Song ..................... G06N 3/045
(Continued)

FOREIGN PATENT DOCUMENTS

CN 105320942 A 2/2016
CN 109255288 A 1/2019
(Continued)

OTHER PUBLICATIONS

Chen, Y. "A Fast Inference Vision Transformer for Automatic Pavement Image Classification and Its Visual Interpretation Method" Remote Sensing, Mar. 24, 2022, pp. 1-20 (Year: 2022).*
(Continued)

*Primary Examiner* — Mia M Thomas
(74) *Attorney, Agent, or Firm* — Kaplan Breyer Schwarz, LLP; Stuart H. Mayer (57) ABSTRACT

Provided is a pavement nondestructive detection and identification method based on small samples, including: constructing an original dataset, dividing the original dataset into several patch blocks, sampling the patch blocks, and obtaining samples of the patch blocks; inputting the samples of the patch blocks into a Transformer model for feature extraction and target reconstruction, and obtaining a trained Transformer model; and based on the trained Transformer model, detecting input pavement sample images.

5 Claims, 5 Drawing Sheets

(51) Int. Cl.
*G06T 3/40* (2006.01)
*G06V 10/40* (2022.01)

(52) U.S. Cl.
CPC .... *G06V 10/40* (2022.01); *G06T 2207/20021* (2013.01); *G06T 2207/30132* (2013.01)

(56) References Cited

U.S. PATENT DOCUMENTS

| | | | |
|---|---|---|---|
| 2022/0375090 A1* | 11/2022 | Hwang | G06F 18/24137 |
| 2023/0145535 A1* | 5/2023 | Hatamizadeh | G06N 3/02 |
| | | | 514/460 |
| 2023/0154171 A1* | 5/2023 | Lee | G06N 3/063 |
| | | | 382/157 |

FOREIGN PATENT DOCUMENTS

| | | |
|---|---|---|
| CN | 113762278 A | 12/2021 |
| CN | 113947538 A | 1/2022 |
| CN | 114612971 A | 6/2022 |
| CN | 114693990 A | 7/2022 |

OTHER PUBLICATIONS

Fan R. "Graph Attention Layer Evolves Semantic Segmentation for Road Pothole Detection: A Benchmark and Algorithms" IEEE Transactions on Image Processing, vol. 30, 2021 (Year: 2021).*
Guo, F. "A novel transformer-based network with attention mechanism for automatic pavement crack detection" Construction and Building Materials 391 (2023) 131852 (Year: 2023).*

* cited by examiner

PAVEMENT NONDESTRUCTIVE DETECTION AND IDENTIFICATION METHOD BASED ON SMALL SAMPLES

CROSS-REFERENCE TO RELATED APPLICATIONS

This application claims priority to Chinese Patent Application No. 202210784688.1, filed on Jul. 5, 2022, the contents of which are hereby incorporated by reference.

TECHNICAL FIELD

The disclosure relates to the technical field of traffic pavement detection, and in particular to a pavement nondestructive detection and identification method based on small samples.

BACKGROUND

In order to popularize detection and master technical conditions of roads at all levels, industry researchers at home and abroad have tried to apply low-cost cameras, street scenes, smartphones, and other non-professional image sensing equipment to pavement automatic detection and studied data processing and analysis methods of the pavement automatic detection, and achieved high accuracy. An application of diversified detection equipment helps to increase a frequency of data acquisition but brings great pressure to data storage and analysis. Currently, processing of pavement distresses often requires confirmation indoors with a computer based on collection of a large number of images, which usually takes twice or more time to complete.

To deal with problems of high data repeatability and huge data volume, it is urgent to screen certain lossy distress data at an acquisition end to remove intact images.

SUMMARY

An objective of the disclosure is to provide a pavement nondestructive detection and identification method based on small samples, so as to solve problems of heavy pavement distress detection and identification works and time-consuming data processing. Pavement anomaly discrimination may help reduce pressure of data storage, transmission, and processing, especially for low-cost and high-frequency detection data.

In order to achieve the above objective, the disclosure provides a following scheme.

A pavement nondestructive detection and identification method based on small samples includes following steps:
constructing an original dataset, dividing the original dataset into several patch blocks, sampling the patch blocks, and obtaining samples of the patch blocks;
inputting the samples of the patch blocks into a Transformer model for feature extraction and target reconstruction, and obtaining a trained Transformer model; and
detecting input pavement sample images based on the trained Transformer model.

Optionally, the original dataset is divided into the several patch blocks based on a grid splitting method to lower resolution and reduce pixels of a picture background.

Optionally, the patch blocks are input into the Transformer model as an input sequence for training to lower the resolution and reduce pixels of an image background.

Optionally, feature extraction is performed based on an encoder in the Transformer model, including: firstly, obtaining the patch blocks by dividing the input equally, and then obtaining image tokens based on a method of linear projection, and adding a position embedding after the tokens are generated to solve position information lost; then, inputting labelled images into the encoder in the Transformer for classification; only using class tokens in the classification; outputting different weight combinations in a process of the linear projection, where information obtained by the different weight combinations is multi-head information.

Optionally, the encoder is a vision transformer (Vit) encoder, and the image tokens are the class tokens.

Optionally, the feature extraction is performed on the multi-head information based on a multi-head attention mechanism, where an expression of multi-head attention features is:

$$\begin{cases} Q^h = W_Q^h E^T \\ K^h = W_Q^h E^T \\ V^h = W_V^h E^T \\ Z_i^h = \sum_{j=1}^{n} \text{softmax}\left(\frac{Q_i K_j^T}{\sqrt{d_k}}\right) V_j \\ Z^h = [Z_0^h; Z_1^h; \ldots ; Z_n^h] \\ MHA(Z) = W_O Z^T \end{cases}$$

where n represents a number of embeddings, $Z^h$ is an output of an h-th head, $d_k$ represents a dimension of K, and a query Q, a key K, and a value V are obtained by an embedding E and a learnable weight W.

Optionally, the target reconstruction includes:
performing pixel-level reconstruction on masked images in the patch blocks based on an MAE, dividing the images into patch blocks, randomly masking parts in the patch blocks, and then arranging unmasked patch blocks in sequence, and sending the unmasked patch blocks to a Transformer Encoder to obtain feature vectors; then, inserting masked patch blocks into the feature vectors according to positions in raw images, and then putting into Decoder, where the Decoder reconstructs pixel information to generate original pictures; where the masked patch blocks only include position information.

Optionally, verifying reliability of the Transformer model based on a mean square loss MSE includes: adjusting model parameters through testing TRIPLET and binary cross-entropy (BCE) loss, where a method for testing the TRIPLET and the BCE loss is:

$BCE = y \log x + (1-y)\log(1-x)$ $MSE = (y-x)^2$ $TRIPLET_{a,p,n} = \max(0, S[d(a,p)]d(a,p) - S[d(a,n)]d(a,n) + \text{margin})$, where y and x are a target and prediction correspondingly, d(·) is a distance function, a, n and p are an anchor sample, a positive sample and a negative sample respectively, and S is a softmax function.

The disclosure has following beneficial effects.

The method according to the disclosure may help to quickly recognize damaged parts and easily repair a decline in the accuracy. Removing similar patches does not affect recognition results. In addition, a low-cost pavement anomaly identification method may be directly applied to edge detection, so an efficiency is further improved.

The disclosure aims to detect road anomalies rapidly to reduce workloads of pavement distress identification, data storage and labelling and effectively solve a problem of insufficient data labelling. A facial recognition-like framework is built in the model, so performance may be enhanced without training by putting new patches into the gallery, that is, the framework has a function of online updating of the tokens in different engineering environments.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labor belong to a protection scope of the disclosure.

In order to make above objects, features and advantages of the disclosure more obvious and easier to understand, the disclosure may be further described in detail with the attached drawings and specific embodiments.

Pavement distress detection and identification is laborious, and data processing is also very time-consuming. Pavement anomaly discrimination may help reduce pressure of data storage, transmission and processing, especially for low-cost and high-frequency detection data. A pavement nondestructive detection and identification method based on small samples is invented to help locate damaged sections of a road.

Figure 1:
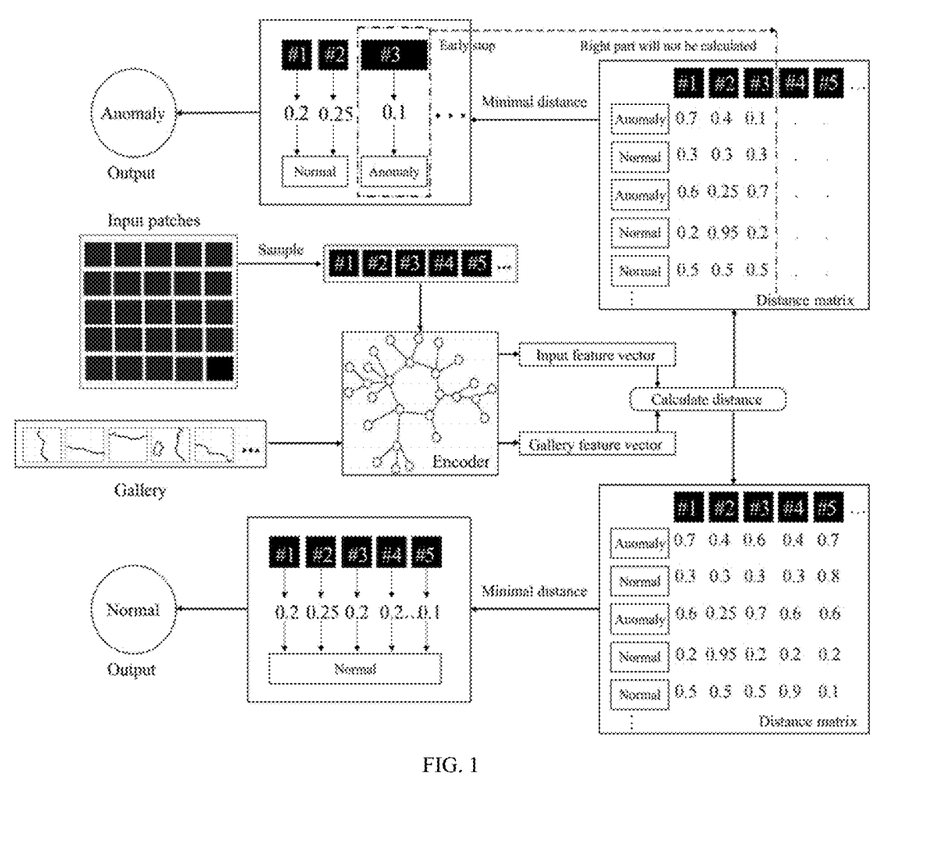
FIG. 1 is a schematic flow diagram of a method according to an embodiment of the disclosure.

As shown in FIG. 1, this embodiment provides a pavement nondestructive detection and identification method based on small samples, including two main parts, a gallery and an encoder.

Firstly, images are divided into several patches, and typical patches are added to the gallery. This may lower resolution and reduce pixels in a background. After model training is completed, the encoder part may be extracted. All the patches may be encoded as feature vectors. Once the vectors are encoded, their similarity may be calculated and a similarity vector (one column) may be got. Finally, a most similar patch with a class of prediction may be found.

Figure 2:
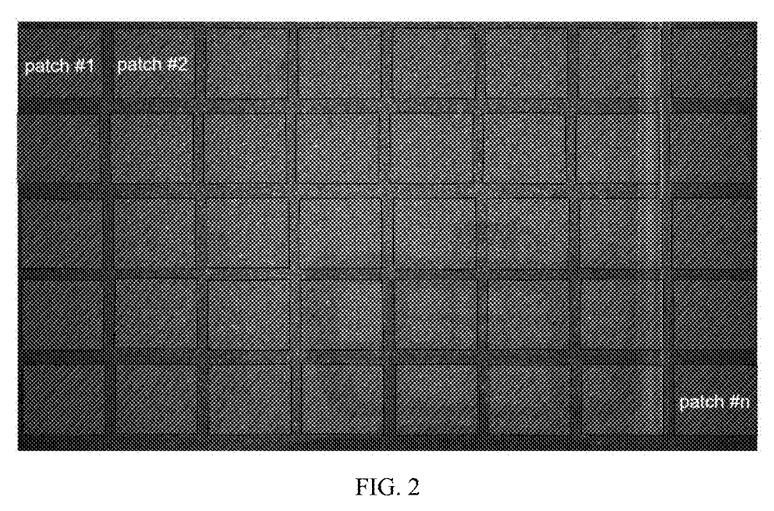
FIG. 2 is a schematic diagram of a method of dividing patches of images according to an embodiment of the disclosure.

A method used to lower input resolution is grid splitting. Another simple method is to directly down-sample the images. FIG. 2 is a schematic diagram of original image segmentation.

Vision transformer (Vit) is a first successful application of Transformer in computer vision (CV). The Vit simply divides the image into patches as an input sequence, so that the Transformer may handle the sequence. Vit adds a [class] token to fuse information used in classification. As shown in FIG. 2, Vit first obtains image patches by dividing the input equally, and then obtains image tokens by performing linear projection. Once tokens are generated, a position embedding may be added to solve position information lost. Then, they are sent to a transformer encoder. Finally, only the [class] token may be used for the classification.

A multi-head attention mechanism may be described as an equation (1).

$$\begin{cases} Q^h = W_Q^h E^T \\ K^h = W_Q^h E^T \\ V^h = W_V^h E^T \\ Z_i^h = \sum_{j=1}^n \text{softmax}\left(\frac{Q_i K_j^T}{\sqrt{d_k}}\right) V_j \\ Z^h = [Z_0^h; Z_1^h; \ldots ; Z_n^h] \\ MHA(Z) = W_O Z^T \end{cases} \quad (1)$$

where n represents a number of embeddings, $Z^h$ is an output of an h-th head, $d_k$ represents a dimension of K. A query Q, a key K, and a value V may be obtained by an embedding E and a learnable weight W.

A final output is dot production of the learnable weight and Z (stacked $Z^h$). Weights of different heads are independent to ensure that features are extracted from different representation subspaces.

A procedure of solving multi-head information may be roughly described as equations (2)-(5).

$$Z_0 = [E_{class}; W^P X_1^T; W^P X_2^T; \ldots ; W^P X_n^T;] + E_{pos} \quad (2)$$

$$Z_l = MSA(LN(Z_{l-1})) + Z_{l-1} \quad (3)$$

$$Z_l = MLP(LN(Z_l)) + Z_l \quad (4)$$

$$Y = LN(Z_L^0) \quad (5),$$

where $Z_0$ represents an input vector and Y is image representation used to classify. $Z_L^0$, is a token of position 0 of Z (also called [class] token), and LN is layer normalization.

A masked autoencoder (MAE) is a method based on a pixel-level reconstruction task of partial masked images. The encoder only encodes visible patches. Once encoding is completed, [mask] tokens may be added to corresponding locations. A decoder may take all the tokens as inputs to reconstruct.

The MAE solves a problem of missing labelling data of small samples, and Vit is the encoder of deformer feature learning.

Generally speaking, the encoder only encodes visible patches. After the encoding is completed, the [mask] tokens may be added at the corresponding locations. The decoder may reconstruct all the tokens as the inputs. A model may only see visible parts of the input and try to reconstruct the input. In this difficult situation, this model uses all parts of the input to reconstruct the input, not just pixels around a masked position.

After the images are divided into small blocks, some of the small blocks are masked at random, and then unmasked pixel blocks are arranged in sequence and sent to Transformer Encoder to obtain the feature vectors. Then, the masked pixel blocks (only containing position information) are inserted into the feature vectors according to original positions, and then put into Decoder. The Decoder reconstructs the pixel information to generate original pictures.

Critical aspects of the MAE may be listed in four parts: mask strategy, the encoder, the decoder and a reconstruction target, so as to force model learning not to rely on local information. In this embodiment, a vanilla ViT is chosen as the encoder, because the ViT may not introduce so much modification to cause overfitting in a specific domain, and the reconstruction target is a mean squared loss.

Significant differences between areas may reduce an accuracy of the model. Therefore, the model needs to be retrained. The encoder of the best ViT-S is extracted as the encoder in the frame. Patches in columns 11, 12, 13, 10, 9, 8 and 6 are selected as inputs. A classification framework is used to simply classify the inputs. If an output of sigmoid is below a threshold, a class is an anomaly (class 0). Once the prediction is an anomaly, a whole input image is an anomaly.

Classification framework: image patches are used as inputs, and an output is normal or abnormal, so it is a binary classification task. Output values are sigmoid input scores ranging from 0 to 1. The closer the value is to 0, the more likely the input is an anomaly (class 0). On the contrary, the more likely the input is normal (class 1). During training, the greater the gap between a predicted value (x) and a truth value (y), the larger the binary cross-entropy (BCE) loss is. When the model is used for inference, a threshold (usually 0.5) is set. When the predicted value is below the threshold, the input is an anomaly and vice versa.

Figure 3:
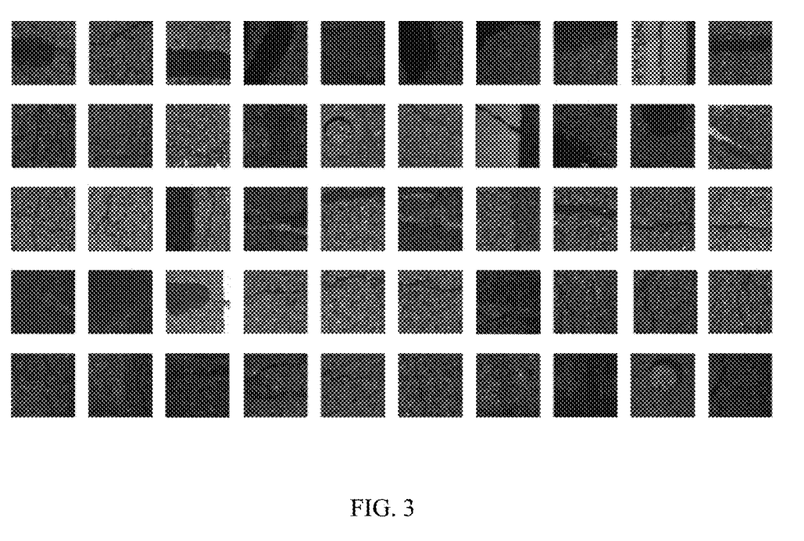
FIG. 3 is a schematic diagram of a gallery according to an embodiment of the disclosure.

The gallery is shown in FIG. 3.

Basic parameters set during the model training are shown in Table 1, basic parameters of Vit-s are shown in Table 2, and parameters of self-supervised learning are shown in Table 3.

TABLE 1

| Model name | Parameter size | Model size |
|---|---|---|
| Resnet34 | 21.3M | 81.17 MB |
| VIT-S | 21.4M | 81.61 MB |

TABLE 2

| Dimension | Number of blocks | Number of heads | Block size |
|---|---|---|---|
| 384 | 12 | 6 | 16 × 16 |

TABLE 3

| Dimension | Number of blocks | Number of heads |
|---|---|---|
| 128 | 2 | 16 |

Figure 4:
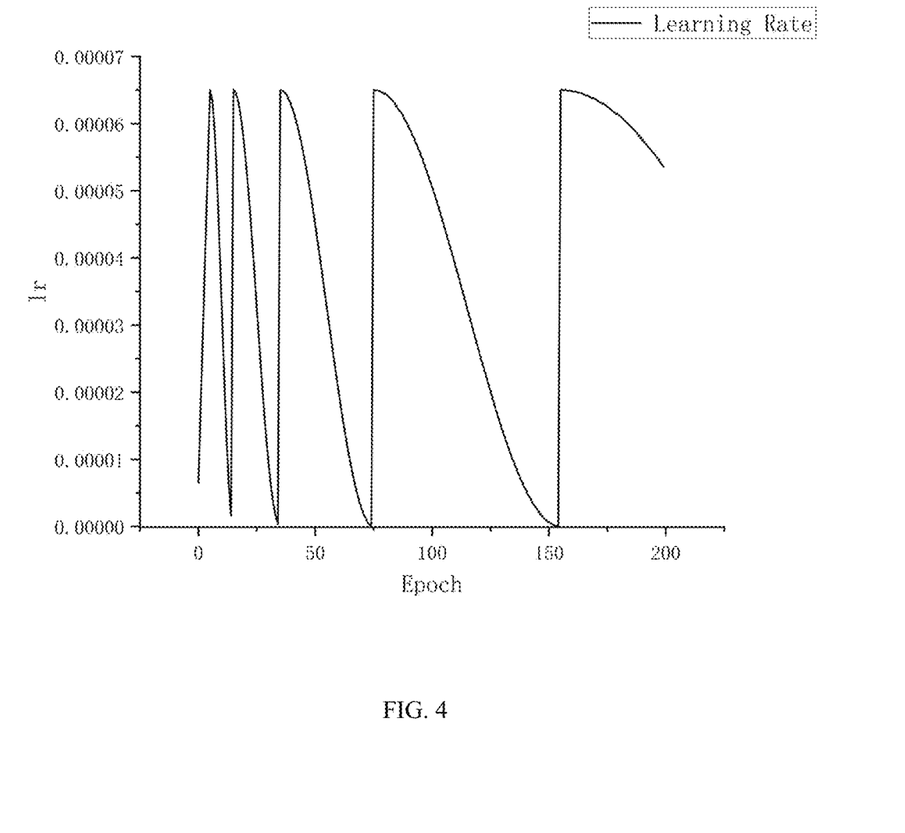
FIG. 4 is a basic learning rate curve according to an embodiment of the disclosure.

Data augmentations (DAs) are used to improve accuracy of quasi-MAE self-supervised learning. With reference to an original MAE, random resized crop, random horizontal flip and normalization are used as standard DAs in this embodiment. A crop size is ranged from 0.2 to 1 and resized to 224×224 px. This means randomly cropping a 20%-100% image area at a random possible position. Normalization uses 0.2253 as an average and 0.0934 as a standard deviation. The average and the standard deviation are calculated from all pictures. A probability of horizontal flip is 0.5. FIG. 4 is a graph of a basic learning rate.

Binary cross-entropy (BCE) loss may be used in supervised learning, as shown in an equation (6). As mentioned above, the supervised learning uses mean square loss (MSE) as shown in an equation (7). In a fine-tuning stage, Triplet as shown in an equation (8) and BCE losses are tested.

$$BCE = y \log x + (1-y)\log(1-x) \qquad (6)$$

$$MSE = (y-x)^2 \qquad (7)$$

$$TRIPLET_{a,p,n} = \max(0, S[d(a,p)]d(a,p) - S[d(a,n)]d(a,n) + \text{margin})) \qquad (8),$$

where y and x are a target and prediction correspondingly, d(·) is a distance function, a, n and p are an anchor sample, a positive sample and a negative sample respectively, and S is a softmax function.

In order to further illustrate an effect of the disclosure, the following is verified by specific experiments.

Two hundred thirty-six high-resolution gray images (213 anomaly images and 23 normal images) are split into 33984 image patches (224×224 px) to construct raw data, so as to emulate lacking labelled data and ensure a balance between normal patches and anomaly patches. As shown in Table 4, 4428 patches are labelled. In addition, another 100 gray images, including 50 normal images and 50 anomaly images, are collected as a test set.

TABLE 4

| Set | Abnormal | Normal | Total |
|---|---|---|---|
| Train | 1951 | 2231 | 4128 |
| Test | 123 | 123 | 246 |
| Total | 2074 | 2354 | 4428 |

Figure 5:
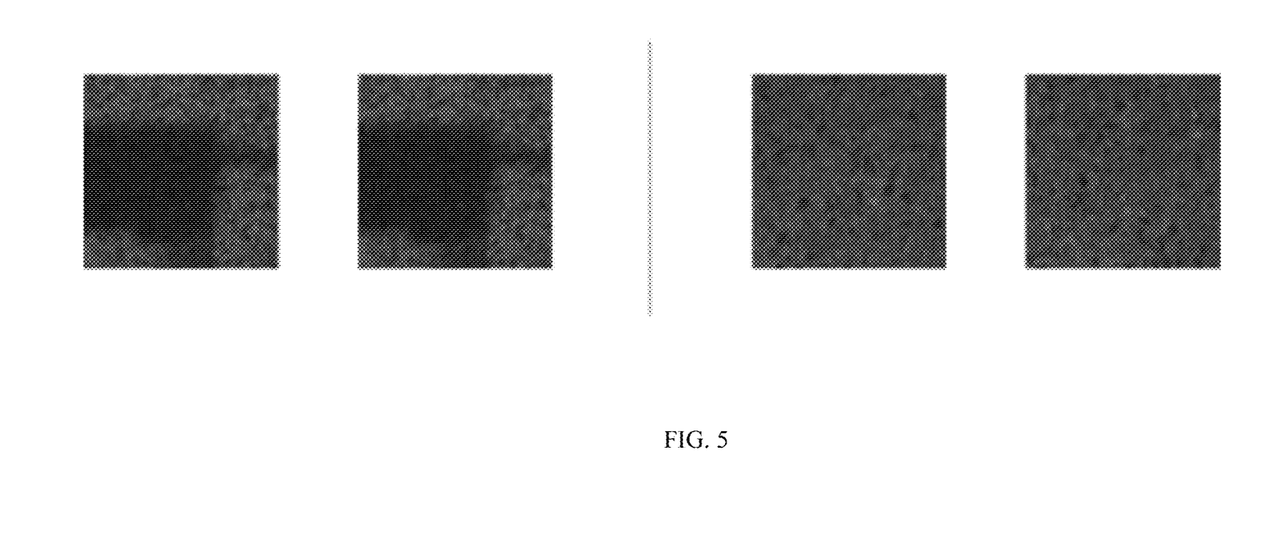
FIG. 5 is a schematic diagram of removable patches according to an embodiment of the disclosure.

For additional datasets, the accuracy is improved from a blind guess of 0.5 to close to an original level (0.88) through online updates, as shown in Table 5 below. Adding 50 misclassified normal patches to the gallery may greatly improve results, showing that our method may improve the accuracy through the online updates. In addition, similar patches may be removed (FIG. 5) without affecting recognition results.

TABLE 5

| Anomaly | Normal | Precision | Recall | Accuracy |
|---|---|---|---|---|
| 50 | 50 | 0.0 | 1.0 | 0.5 |
| 50 | 50† | 0.0 | 1.0 | 0.5 |
| 50 | 100 | 0.6 | 0.92 | 0.76 |
| 50 | 120 | 0.92 | 0.84 | 0.88 |
| 50 | 100‡ | 0.9 | 0.86 | 0.88 |

The method according to the disclosure may help to quickly recognize damaged parts and easily repair a decline in the accuracy. Removing similar patches does not affect the recognition results. In addition, a low-cost pavement anomaly identification method may be directly applied to edge detection, which may further improve efficiency.

The disclosure aims to detect road anomalies, rapidly to reduce workloads of pavement distress identification, data storage and labelling, and may effectively solve a problem of inadequate labelling. A facial recognition-like framework is built in the model, so performance may be enhanced without training by putting new patches into the gallery, that is, the framework has a function of online updating of the tokens in different engineering environments.

The above-mentioned embodiments are only a description of preferred modes of the disclosure, and do not limit a scope of the disclosure. Under a premise of not departing from a design spirit of the disclosure, various modifications and improvements made by ordinary technicians in the field to technical schemes of the disclosure shall fall within the protection scope determined by claims of the disclosure.

What is claimed is:

1. A pavement nondestructive and identification method based on small samples, comprising: constructing an original dataset, dividing the original dataset into several patch blocks, sampling the patch blocks, and obtaining samples of the patch blocks; inputting the samples of the patch blocks into a transformer model for feature extraction and target reconstruction, and obtaining a trained transformer model; detecting input pavement sample images based on the trained transformer model; inputting the patch blocks as an input sequence into the transformer model for training to lower resolution and reduce pixels of an image background; and performing feature extraction based on an encoder in the transformer model, comprising, firstly, obtaining the patch blocks by dividing the input equally, and then obtaining image tokens based on a method of linear projection, and adding a position embedding after the tokens are generated to solve position information lost; then, inputting labelled images into the encoder in the transformer for classification; only using class tokens in the classification; outputting different weight combinations in a process of the linear projection, wherein information obtained by the different weight combinations is multi-head information; and performing the feature extraction on the multi-head information based on a multi-head attention mechanism; the target reconstruction comprises: performing pixel-level reconstruction on masked images in the patch blocks based on an a masked autoencoder, dividing the images into patch blocks, randomly masking parts in the patch blocks, and then arranging unmasked patch blocks in sequence, and sending to a transformer encoder to obtain feature vectors; then, inserting masked patch blocks into the feature vectors according to positions in raw images, and then putting into decoder, wherein the decoder reconstructs pixel information to generate original pictures; wherein the masked patch blocks only comprise position information.

2. The pavement nondestructive detection and identification method based on the small samples according to claim 1, wherein the original dataset is divided into the several patch blocks based on a grid splitting method to lower the resolution and reduce pixels of a picture background.

3. The pavement nondestructive detection and identification method based on the small samples according to claim 1, wherein the encoder is a Vit encoder, and the image tokens are the class tokens.

4. The pavement nondestructive detection and identification method based on the small samples according to claim 1, wherein an expression of multi-head attention features is:

$$\begin{cases} Q^h = W_Q^h E^T \\ K^h = W_Q^h E^T \\ V^h = W_V^h E^T \\ Z_i^h = \sum_{j=1}^n \text{softmax}\left(\dfrac{Q_i K_j^T}{\sqrt{d_k}}\right) V_j \\ \mathcal{Z}^h = [Z_0^h; Z_1^h; \ldots ; Z_n^h] \\ MHA(\mathcal{Z}) = W_O \mathcal{Z}^T \end{cases}$$

wherein n represents a number of embeddings, $\mathcal{Z}^h$ is an output of an h-th head, $d_k$ represents a dimension of K, and a query Q, a key K and a value V are obtained by an embedding E and a learnable weight W.

5. The pavement nondestructive detection and identification method based on the small samples according to claim 1, wherein verifying reliability of the transformer model based on a mean square loss (MSE) comprises: adjusting model parameters through testing TRIPLET and BCE loss, wherein a method for testing the TRIPLET and the BCE loss is:

$$BCE = y \log x + (1-y)\log(1-x)$$

$$MSE = (y-x)^2$$

$$TRIPLET_{a,p,n} = \max(0, S[d(a,p)]d(a,p) - S[d(a,n)]d(a,n) + \text{margin})),$$

wherein y and x are a target and prediction correspondingly, d(-) is a distance function, a, n and p are an anchor sample, a positive sample and a negative sample respectively, and S is a softmax function.

* * * * *